United States Patent [19]

McKinnon

[11] Patent Number: 5,161,836
[45] Date of Patent: Nov. 10, 1992

[54] PIPE CONNECTING APPARATUS

[76] Inventor: Robert M. McKinnon, P.O. Box 648, Bedford, Tex. 76021-0648

[21] Appl. No.: 824,368

[22] Filed: Jan. 23, 1992

[51] Int. Cl.⁵ .......................................... F16L 17/025
[52] U.S. Cl. .................................... 285/373; 285/23; 285/351
[58] Field of Search .............. 285/236, 373, 419, 112, 285/23

[56] References Cited

U.S. PATENT DOCUMENTS

| | | | |
|---|---|---|---|
| 982,028 | 1/1911 | Austin | 285/373 X |
| 1,566,953 | 12/1925 | Becker | 285/373 X |
| 3,251,615 | 5/1966 | Short | 285/373 X |
| 4,842,306 | 6/1989 | Zeidler et al. | 285/373 X |

FOREIGN PATENT DOCUMENTS 794580  5/1958  United Kingdom ................ 285/373

Primary Examiner—Dave W. Arola
Attorney, Agent, or Firm—Arthur F. Zobal; Geoffrey A. Mantooth

[57] ABSTRACT

Two clamp members are formed to be fitted around the outer wall of a flexible sleeve when the ends of two pipes are located in the opening of the sleeve with adjacent edges of the two clamp members engaging each other in a clamped position for clamping the sleeve to the ends of the two pipes. Each of the clamp members has two spaced apart clamping ridges extending radially inward from its inner wall continuously between its two edges. The two clamping ridges of the two clamp members are located such that when the two clamp members are located around the outer wall of the sleeve and adjacent edges of the two clamp members engage each other, the two clamping ridges of the two clamp members form two spaced apart clamping ridges extending 360 degrees around the inside walls of the two clamp members for engaging the outside wall of the sleeve forming a seal between the sleeve and the ends of the two pipes when located in the opening of the sleeve. One of the clamp members has arcuate extensions extending from its two edges located and having widths such that the extensions will fit between the two clamping ridges of the other of the clamp members when the two clamp members are located in the clamped position. The clamp members are particularly useful with an industry approved gasket sleeve.

11 Claims, 3 Drawing Sheets

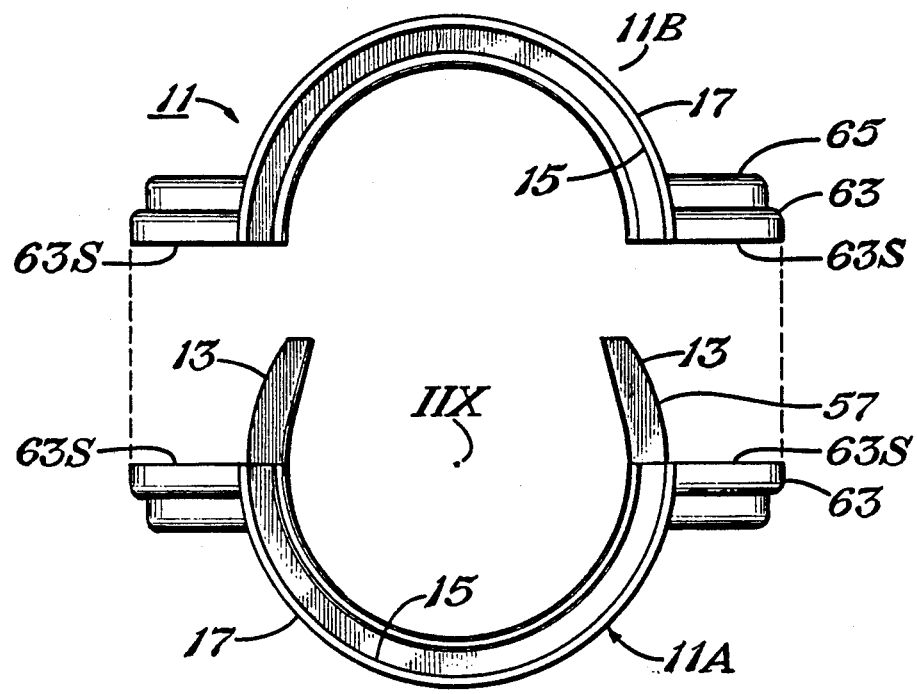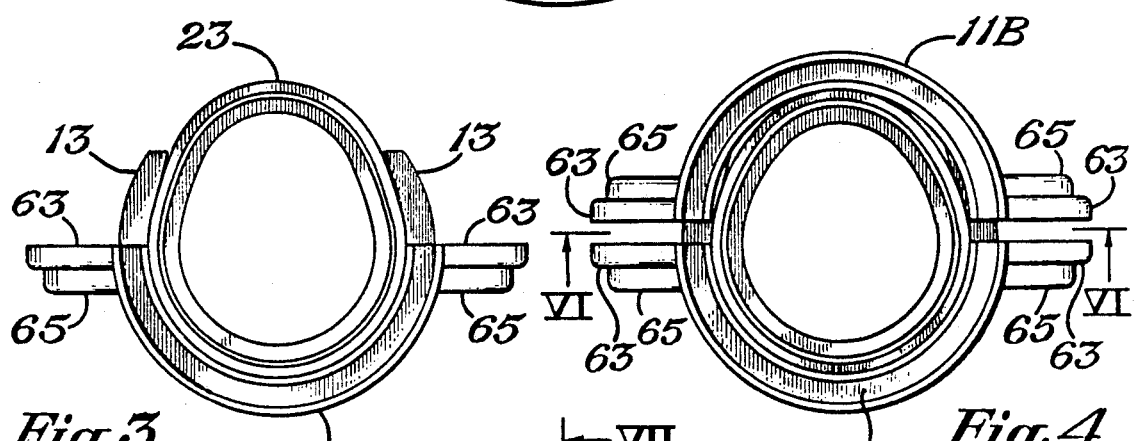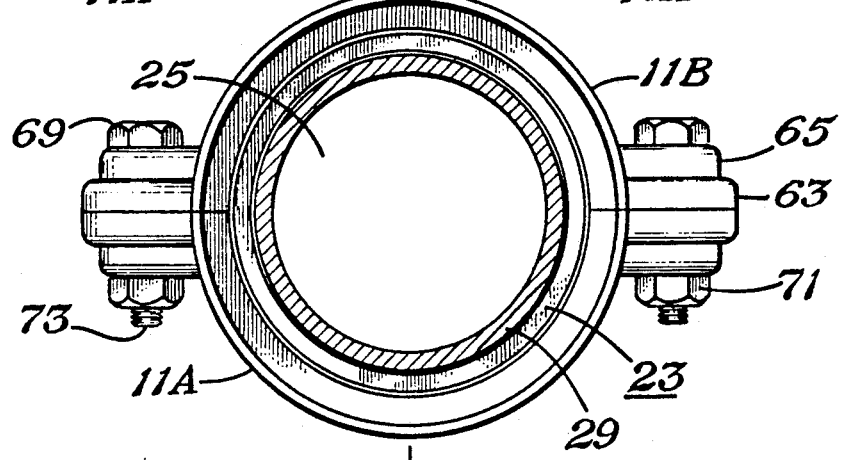

PIPE CONNECTING APPARATUS

BACKGROUND OF THE INVENTION

1. Field of the Invention

The present invention relates to pipe joint connectors, particularly of the type used in connecting low pressure fluid pipes such as drainage or sewer pipes.

2. Description of the Prior Art

Low pressure fluid pipes in buildings require sealing connectors to prevent leakage between joined sections of pipes. A commonly used connector consists of a neoprene pipe sleeve gasket and a bendable metal plate clamp. The sleeve gasket, which has been approved by the industry, has a radially inward extending central ridge between its two ends and two pairs of smaller radially inwardly extending ridges with one pair located at each end of the sleeve. The metal plate clamp has a width equal to the length of the sleeve and a length about equal to the outside circumference of the sleeve. Metal worm screw clamping devices are attached to opposite ends of the length of the plate. The pipe ends are located in the sleeve such that the edges thereof engage the central ridge with the end ridges of the sleeve engaging the outer surfaces of the pipe ends. The plate is pre-formed and is fitted around the sleeve and clamped thereto with the worm screw clamping devices.

In buildings, the drainage pipes have lengths of about 10 feet so a joint is formed every 10 feet. Metal straps are used to hang the pipe at the upper portions of the wall structure. The metal clamping plates used in the past are formed of stainless steel and have a thickness of ⅛ of an inch or less.

The plate clamps are made thin to facilitate use and to minimize cost. Problems have occurred in the past in that the thin plate clamp provides a gasket seal of only about 15 psi and does not rigidly hold the pipes requiring about 5 hangers for every 10 feet of pipe increasing the cost. Moreover, the thin plate clamps have sharp edges which can be dangerous to the installer and are difficult to use.

SUMMARY OF THE INVENTION

An object of the invention is to provide a more effective clamping apparatus for clamping a pipe sleeve gasket onto the ends of fluid pipes.

Another object is to provide a safer clamping apparatus for clamping a pipe sleeve gasket sleeve onto the ends of fluid pipes.

Another object is to provide a less expensive and stronger clamping apparatus than has been used in the past for clamping a pipe sleeve gasket onto the ends of fluid pipes.

The clamping apparatus of the invention comprises two clamp means each having two edges with an arcuate shaped inner wall formed between the two edges to enable the two clamp means to be fitted around the outer wall of the sleeve when the ends of the two pipes are located in the opening of the sleeve with adjacent edges of the two clamp means engaging each other in a clamped position for clamping the sleeve to the ends of the two pipes. Each of the clamp means has two spaced apart clamping ridges extending radially inward from its inner wall continuously between its two edges. The two clamping ridges of the two clamp means are located such that when the two clamp means are located around the outer wall of the sleeve and adjacent edges of the two clamp means engage each other, the two clamping ridges of the two clamp means form two spaced apart clamping ridges extending 360 degrees around the inside walls of the two clamp means for engaging the outside wall of the sleeve forming a seal between the sleeve and the ends of the two pipes when located in the opening of the sleeve.

In another aspect, one of the clamp means has arcuate extensions extending from its two edges located and having widths such that the extensions will fit between the two clamping ridges of the other of the clamp means when the two clamp means are located in the clamped position.

In a further aspect, the clamping apparatus is particularly useful with the industry approved sleeve gasket in that the two clamping ridges of the two clamp means are located such that when the two clamp means are located around the outer wall of the sleeve and adjacent edges of the two clamp means engage each other, the clamping ridges of the two clamp means form two spaced apart clamping ridges extending 360 degrees around the inside walls of the two clamp means in alignment with the two grooves of the sleeve formed between the two pairs of smaller ridges thereof for forming a seal between the two pairs of ridges of the sleeve and the ends of the two pipes when located in the opening of the sleeve. This seal is very effective, providing leakage protection at fluid pressures up to 60 psi.

In addition, the clamping apparatus is safe to use. Since it has not sharp edges, it presents no danger to the installer. Installation also is easy. Because of the strength of the clamp apparatus, only two clamps every ten feet of pipe are necessary, rather than five clamps every ten feet. Since fewer clamps are necessary, and since the clamp apparatus is manufactured at less expense than steel plates, the apparatus provides a more cost efficient method of clamping drainage pipes in buildings.

BRIEF DESCRIPTION OF THE DRAWINGS

FIG. 2 is an end view of the clamp members of FIG. 1 showing how the members fit together.

FIG. 3 is an end view of one clamp member with extensions, with the flexible sleeve located inside.

FIG. 4 is an end view of the clamp members holding the flexible sleeve before the clamp members are secured together.

FIG. 5 is an end view of the assembled apparatus, with the flexible sleeve held by the secured clamp members. In FIG. 5, a pipe in cross-section is shown within the sleeve.

DETAILED DESCRIPTION OF THE INVENTION

Figure 1:
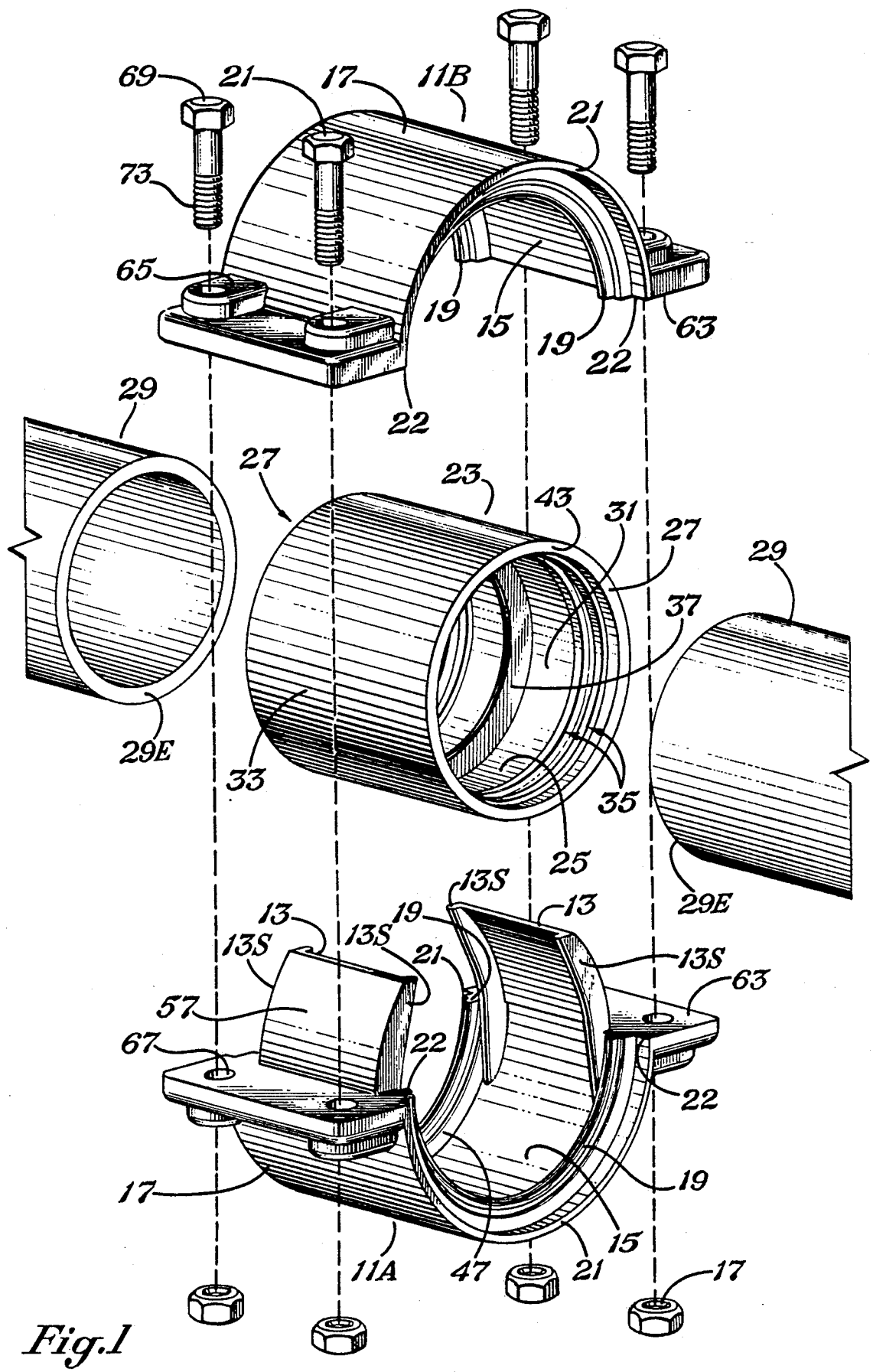
FIG. 1 is an exploded isometric view of the pipe connecting apparatus of the present invention.

The pipe connecting apparatus of FIG. 1 includes a clamp comprising clamp members 11A, 11B that may be engaged (FIG. 5) and disengaged. Each of the clamp members 11A, 11B have inner and outer walls 15 and 17, semi-circular in cross section, and two spaced apart radially inwardly extending clamping ridges 19 spaced inwardly from the ends 21 of the clamp members 11A and 11B. Each of the ridges 19 comprise a center portion 47 and inner and outer shoulders 49 and 51. The ridges 19 extend continuously between edges 22 of the clamp members 11A and 11B and the inside surfaces of members 47, 49, and 51 are semi-circular in shape. Members 11A and 11B each have two flanges 63 extending outward from edges 22. Clamp member 11A has two arcuate extensions 13 extending from its two edges 22 which are used to guide the clamp member 11A to the engaged or clamped position where the surfaces 63S of flanges 63 engage each other and to facilitate installation of the apparatus around pipe ends as will be described subsequently.

The clamp 11 is constructed to be particularly useful with the sleeve gasket 23 which is a prior art industry approved gasket. The sleeve 23 is a flexible member having an opening 25 extending therethrough between two opposite ends 27 for receiving the ends of two pipes 29. The flexible sleeve 23 has cylindrical shaped inner and outer walls 31 and 33. The sleeve 23 has an outside diameter that is slightly smaller than the inside diameters of shoulders 49 and 51, yet slightly larger than the inside diameter of the center portions 47 of the ridges 19 of the engaged clamp 11, enabling the compressed sleeve 23 to fit snugly in the engaged clamp 11. Spaced inwardly from the ends 27 of the flexible sleeve 23 are two pairs of radially inwardly extending ridges 35 which extend 360 degrees around the inside wall 31 of the sleeve 23. A groove 41 is formed between each pair of ridges 35. A center gasket ridge 37 extends radially inward from the inner wall 31 of the flexible sleeve 23 and 360 degrees around the inner wall 31.

To connect the pipes using the apparatus, the ends of the pipes 29 are inserted into the flexible sleeve 23 through the sleeve ends 27 until their edges 29E, engage opposite sides of the center gasket ridge 37 which acts as a gasket seal for the ends of the pipe 29.

The inside diameters of the ridges 35 allow the ends of the pipes 29 to enter the sleeve and then the ridges are compressed against the ends of the pipe 29 when pressure is applied to the outer wall 33 of the flexible sleeve 23. Compression of the ridges 35 against the outer walls of the ends of the pipes 29 forms a seal between the ridges 35 and the ends of the pipes 29 and secures the pipes together.

Figure 7:
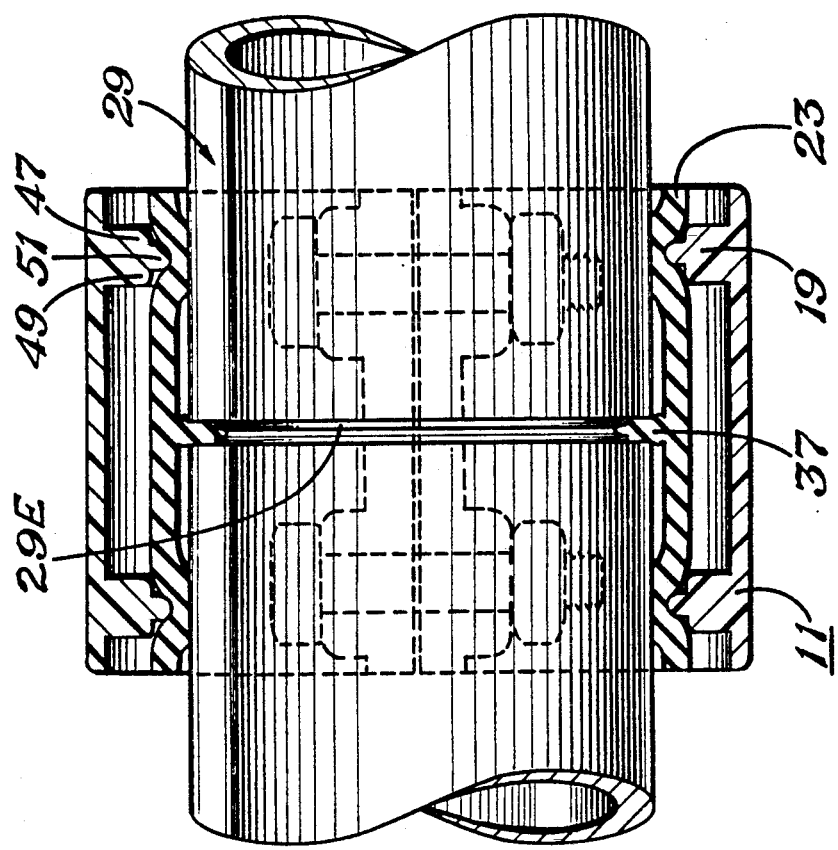
FIG. 7 is a cross-sectional view of FIG. 5 taken along the lines 7—7 thereof.

In the clamped position of the clamp members 11A and 11B, the clamping ridges 19 extend 360 degrees around the inner walls of the clamp members 11A and 11B. These clamping ridges 19 engage the outer wall 33 of the sleeve 23 and provide the compression force necessary to seal the pairs of ridges 35 of the flexible sleeve 23 to the ends of the pipes 29 when inserted into the flexible sleeve 23, and when the clamp members 11A and 11B are clamped around the sleeve 23 at positions such that the ends 21 of the clamp members 11A and 11B are centered with respect to the ends 27 of the sleeve 23. In this position, the clamping ridges 19 are compressed into the outer wall 33 of the flexible sleeve 23, which in turn compresses the pairs of ridges 35 of the sleeve 23 against the pipe ends 29, creating a seal (See FIG. 7) and securing the ends of the pipes 29 together. Bolts 69 are used to hold the clamp members 11A and 11B together in the clamped position as shown in FIG. 7.

Figure 6:
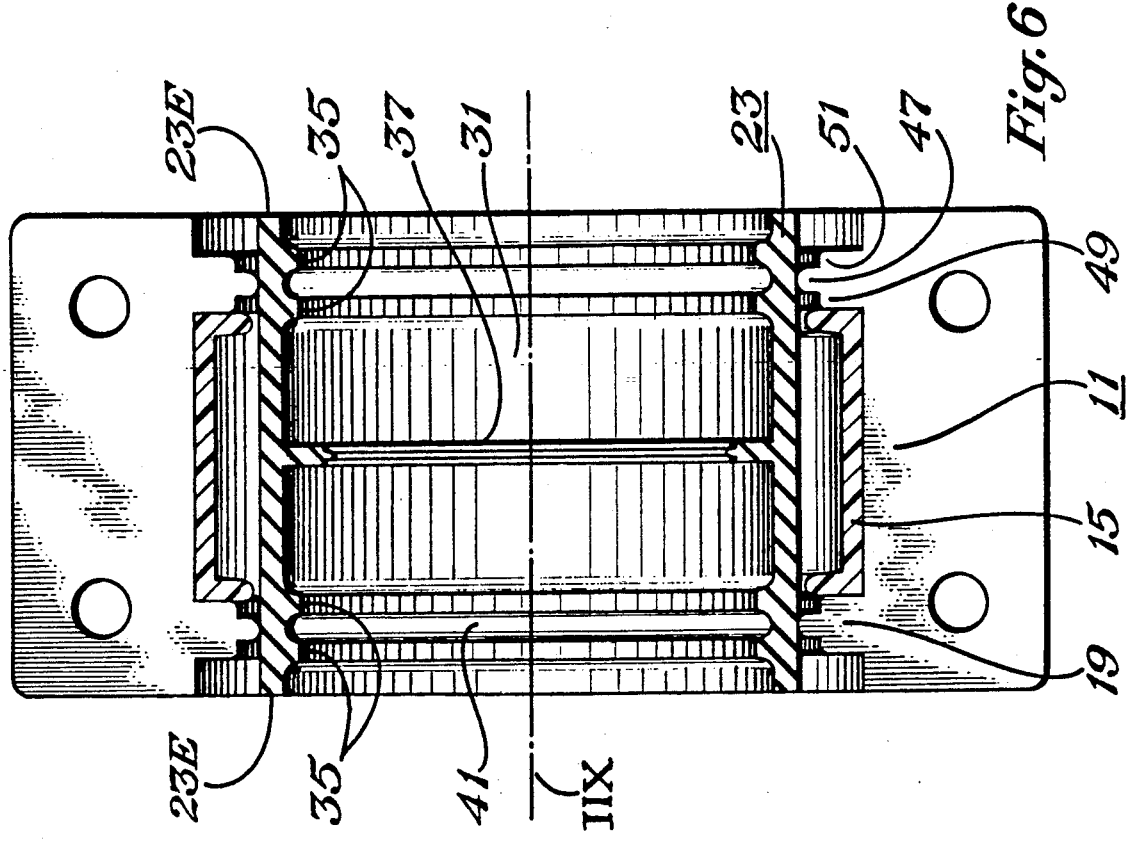
FIG. 6 is a cross-sectional view of FIG. 4 taken along the lines 6—6 thereof.

The clamping ridges 19 are designed to maximize the compression of the pairs of ridges 35 of the sleeve 23 against the pipe ends 29. Each clamping ridge 19 has a center portion 47 and inner and outer shoulders 49 and 51 (See FIG. 6). The center portion 47 extends radially inward from the clamp's inner wall 15 farther than the inner and outer shoulders 49 and 51. The inner and outer shoulders 49 and 51 extend radially inward from the inner wall of the clamp 15 the same distance. The center portion 47 of each of the clamping ridges 19 has a width equal to the width of the grooves 41 formed between the pairs of ridges 35 on the sleeve's inner wall 31. The inner and outer shoulders 49 and 51 of the clamping ridge 19 have widths slightly smaller than the widths of the ridges 35 on the flexible sleeve's inner wall 31. When the clamp members 11A and 11B are clamped around the sleeve's outer wall 33 with the ends 21 centered or aligned with respect to the ends 27, the clamping ridges 19 align with the pairs of ridges 35 on the inner wall of the flexible sleeve 31 so that the center portions 47 of the clamping ridges 19 are aligned with the grooves 41 between the pairs of ridges 35 on the inner wall of the flexible sleeve 31 and the inner and outer shoulders 49 and 51 of the clamping ridges 19 are aligned with the ridges 35 of the two pairs of ridges 35 respectively of the sleeve 23. When the clamp members 11A and 11B are secured together, the ridges 19 including the center portions 47 of the ridges 19, compress the sleeve portions aligned with the grooves 41 and the pair of ridges 35 against the outer walls of the ends of the pipes 29 as shown in FIG. 7 creating an effective seal therebetween and securing the ends of the pipes 29 together.

The clamp members 11A, 11B are engaged by inserting the arcuate extensions 13 of the clamp member 11A within the space formed between the inner wall 15 and the ridges 19 of the other clamp member 11B. The width of each of the extensions 13 is less than the distance between the inner shoulders 49 of the ridges 19 of members 11A and 11B. The outer surfaces 57 of the extensions 13 are arcuate and have a radius with respect to the axis 11X that is slightly less than the radius of the inner walls 15 of the clamp members 11A and 11B such that when the extensions 13 are inserted between the ridges 19 and within the inner wall 15 of the member 11B, the extensions 13 will slide between the ridges 19 of the member 11B and along the inner wall 15 of member 11B to allow the members 11A and 11B to be clamped together where the surfaces 63S of the flanges 63 engage each other. The width of the extensions 13 are such that a friction fit is formed between the outer shoulders 13S of the extension 13 and the inner walls of the inner shoulders 49 of the ridges 19 of member 11B when the extensions 13 are inserted between the ridges 19 and inner wall 15 of the member 11B. This allows the members 11A and 11B to be held together while they are being moved to their clamped position which facilitates the installation process.

Each clamp member 11A and 11B has two flanges 63 extending outward such that surfaces 63S form a plane that extends through the axis 11X. Each flange 63 has two bolt holders 65 which extend from the sides opposite the surfaces 63S. Bolt holes 67 extend through the flanges 63 and bolt holders 65. Bolts 69 are placed through the bolt holes 67 and nuts 71 are screwed to the threads 73 of the bolts 69 to tighten the clamp members 11A and 11B together to form the clamp 11 which compresses the flexible sleeve 23 onto the ends of the pipes 29.

As mentioned above, the sleeve gasket 23 is an industry approved flexible gasket made of neoprene. The clamp members 11A and 11B are made of polypropylene and are semi-rigid and slightly resilient members whereby the extensions 13 may be manually moved apart to allow member 11A to be placed around the sleeve 23 with the ends of pipe 29 located therein. When the extensions are released they return to their normal positions.

In using the apparatus, the ends of two pipes 29 are inserted into the opening 25 of the sleeve 23 until their edges 29E engage opposite sides of the center seal 37. The extensions 13 are spread apart and the member 11A placed partially around the sleeve 23 with ends 21 and 27 aligned. The extensions 13 hold the member 11A in this position. The member 11B then is moved toward the member 11A to insert the extensions 13 between the ridges 19 and within the wall 15 of the member 11B until surfaces 63S of flanges 63 engage each other. The bolts 69 and nuts 71 then are used to secure the members 11A and 11B together for forming a seal between gasket 23 and the outer wall of the pipe ends as described above.

In one embodiment for use with a 2" pipe, the sleeve gasket 23 has an outer diameter of 2½", an inner wall 31 diameter of 2¼ and an axial length of about 2 1/16". A 2" pipe has an inner diameter of 2" and an outer diameter of 2¼". The pairs of ridges 35 extend 1/16" radially inward from the inner wall 31 of the sleeve gasket 23 while the center gasket ridge 37 extends ⅜" radially inward from the sleeve gasket 23 inner wall 31.

For use with a gasket sleeve adapted to receive a 2" pipe, the engaged clamp 11 has an outer diameter of 3 1/16" and an inner diameter between walls 15 of about 2 15/16". The clamping ridges 19 have inner and outer shoulders 49, 51 each of which extends slightly less than 3/16" radially inward from the clamp inner walls 15. The center portions 47 of the clamping ridges 19 extend slightly less than ¼" radially inward from the clamp inner walls 15. The axial length of each of members 11A and 11B is about 2 1/16". The arcuate extensions 13 extend from the clamp member 11A edges 22 a distance of about ⅞". The extensions 13 have a width of about 1 9/32". The inner shoulders 49 of the clamping ridges 19 of the clamp portions 11A and 11B are spaced apart slightly greater than 1 9/32" so that the extensions 13 of the clamp member 11A may slip between the inner shoulders 49 of clamp member 11B to engage the clamp 11. The flanges 63 that are used to secure the engaged clamp 11 have a width, extending from the outer wall 17 of the engaged clamp 11, of ¾".

It is to be understood that the clamp members 11A and 11B may have different dimensions to fit sleeve gaskets used on different size pipes.

I claim:

1. An apparatus for connecting together the ends of two pipes comprising:
   a flexible sleeve having an opening extending therethrough between two opposite ends for receiving the ends of two pipes,
   said flexible sleeve having an inner wall and an outer wall,
   two clamp means each having two edges with an arcuate shaped inner wall formed between said two edges to enable said two clamp means to be fitted around the outer wall of said sleeve when the ends of the two pipes are located in said opening of said sleeve with adjacent edges of said two clamp means engaging each other in a clamped position for clamping said sleeve to the ends of the two pipes,
   said arcuate shaped inner wall of each of said clamp means being located at a given radius from a central axis of each of said clamp means,
   each of said clamp means having two spaced apart clamping ridges extending radially inward from its said inner wall continuously between its said two edges,
   each of said clamping ridges of each of said clamp means comprising a central portion located between two shoulders with said two shoulders extending radially inward from said inner wall thereof to a first inward radius from said central axis thereof and with said central portion extending radially inward relative to said inner wall thereof to a second inward radius from said central axis thereof less than said first inward radius,
   said two clamping ridges of said two clamp means being located such that when said two clamp means are located around said outer wall of said sleeve and adjacent edges of said two clamp means engage each other, said clamping ridges of said two clamp means from two spaced apart clamp ridges extending 360 degrees around said inner walls of said two clamp means for engaging the outer wall of said sleeve for forming a seal between said sleeve and the ends of the two pipes when located in said opening of said sleeve, and
   means for use for securing said two clamp means in said clamped position.

2. The apparatus of claim 1, wherein:
   said inner wall of each of said clamp means along the entire distance between its said two clamping ridges has the same radius from its said central axis,
   one of said clamp means has arcuate extensions extending from its said two edges, located and having widths such that said extensions will fit between said two clamping ridges of the other of said clamp means when said two clamp means are located in said clamped position.

3. An apparatus for connecting together the ends of two pipes comprising:
   a flexible sleeve having an opening extending therethrough between two opposite ends for receiving the ends of two pipes,
   said flexible sleeve having an inner wall and an outer wall,
   said flexible sleeve has two pairs of spaced apart ridges extending radially inward from its said inner wall 360 degrees continuously around its said inner wall,
   each of said pairs of ridges being located near one of said opposite ends of said sleeve and forming a groove such that said two pairs of ridges form two spaced apart grooves located within said opening of said sleeve,
   two clamp means each having two edges with an arcuate shaped inner wall formed between said two edges to enable said two clamp means to be fitted around the outer wall of said sleeve when the ends of the two pipes are located in said opening of said sleeve with adjacent edges of said two clamp means engaging each other in a clamped position for clamping said sleeve to the ends of the two pipes,
   each of said clamp means having two spaced apart clamping ridges extending radially inward from its said inner wall continuously between its said two edges, said two clamping ridges of said two clamp means being located such that when said two clamp means are located around said outer wall of said sleeve and adjacent edges of said two clamp means engage each other, said clamping ridges of said two clamp means form two spaced apart clamping ridges extending 360 degrees around said inner walls of said two clamp means in alignment with said two grooves respectively of said sleeve for forming a seal between said two pairs of ridges of said sleeve and the ends of the two pipes when located in said opening of said sleeve, and means for use for securing said two clamp means in said clamped position.

4. The apparatus of claim 3, wherein:

one of said clamp means has arcuate extensions extending from its said two edges, located and having widths such that said extensions will fit between said two clamping ridges of the other of said clamp means when said two clamp means are located in said clamped position.

5. The apparatus of claim 3, wherein:

said arcuate shaped inner wall of each of said clamp means being located at a given radius from a central axis of each of said clamp means, each of said clamping ridges of each of said clamp means comprising a central portion located between two shoulders with said two shoulder extending radially inward from said inner wall thereof to a first inward radius from said central axis thereof and with said central portion extending radially inward relative to said inner wall thereof to a second inward radius from said central axis thereof less than said first inward radius, whereby when said two clamp means are located around said outer wall of said sleeve, said central portions of said two clamping ridges are located in alignment with said two grooves respectively of said sleeve.

6. The apparatus of claim 5, wherein:

said inner wall of each of said clamp means along the entire distance between its said two clamping ridges has the same radius from its said central axis, one of said clamp means has arcuate extensions extending from its said two edges, located and having widths such that said extensions will fit between said two clamping ridges of the other of said clamp means when said two clamp means are located in said clamped position.

7. An apparatus for use for clamping a sleeve around the ends of two pipes for connecting together the ends of the two pipes, said sleeve being a flexible sleeve having an opening extending therethrough between two opposite ends for receiving the ends of the two pipes, and having an inner wall and an outer wall, said apparatus comprising:

two clamp means each having two edges with an arcuate shaped inner wall formed between said two edges to enable said two clamp means to be fitted around the outer wall of said sleeve when the ends of the two pipes are located in said opening of said sleeve with adjacent edges of said two clamp means engaging each other in a clamped position for clamping said sleeve to the ends of the two pipes, said arcuate shaped inner wall of each of said clamp means being located at a given radius from a central axis of each of said clamp means, each of said clamp means having two spaced apart clamping ridges extending radially inward from its said inner wall continuously between its said two edges, each of said clamping ridges of each of said clamp means comprising a central portion located between two shoulders with said two shoulders extending radially inward from said inner wall thereof to a first inward radius from said central axis thereof and with said central portion extending radially inward relative to said inner wall thereof to a second inward radius from said central axis thereof less than said first inward radius, said two clamping ridges of said two clamp means being located such that when said two clamp means are located around said outer wall of said sleeve and adjacent edges of said two clamp means engage each other, said clamping ridges of said two clamp means from two spaced apart clamping ridges extending 360 degrees around said inner walls of said two clamp means for engaging the outer wall of said sleeve for forming a seal between said sleeve and the ends of the two pipes when located in said opening of said sleeve, and means for use for securing said two clamp means in said clamped position.

8. The apparatus of claim 7, wherein:

one of said clamp means has arcuate extensions extending from its said two edges, located and having widths such that said extensions will fit between said two clamping ridges of the other of said clamp means when said two clamp means are located in said clamped position.

9. The apparatus of claim 7 for use with a sleeve of the type having:

two pairs of spaced apart ridges extending radially inward from its said inner wall 360 degrees continuously around its said inner wall, each of said pairs of ridges being located near one of said opposite ends of said sleeve and forming a groove such that said two pairs of ridges form two spaced apart grooves located within said opening of said sleeve, said two clamping ridges being located such that when said two clamp means are located around said outer wall of said sleeve and adjacent edges of said two clamp means engage each other, said clamping ridges of said two clamp means form two spaced apart clamping ridges extending 360 degrees around said inner walls of said two clamp means with said central portions of said two clamping ridges being in alignment with said two grooves respectively of said sleeve for forming a seal between said two pairs of ridges of said sleeve and the ends of the two pipes when located in said opening of said sleeve.

10. The apparatus of claim 9 wherein:

one of said clamp means has arcuate extensions extending from its said two edges, located and having widths such that said extensions will fit between said two clamping ridges of the other of said clamp means when said two clamp means are located in said clamped position.

11. The apparatus of claim 10, wherein:

said inner wall of each of said clamp means along the entire distance between its said two clamping ridges has the same radius from its said central axis.

* * * * *